(No Model.)
I. KITSEE.
SECONDARY BATTERY.
No. 400,226. Patented Mar. 26, 1889.
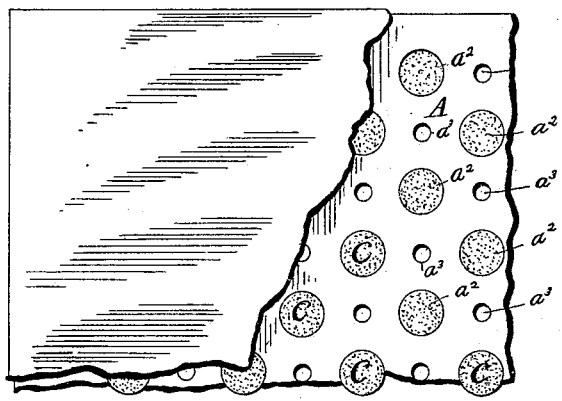
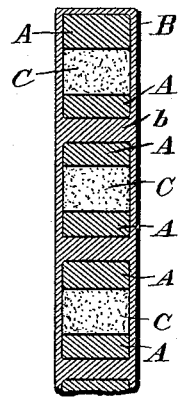
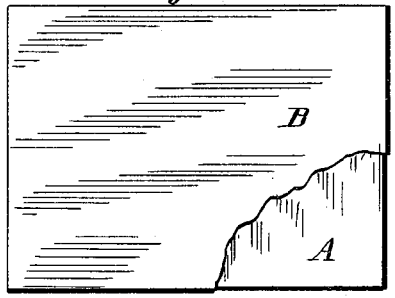
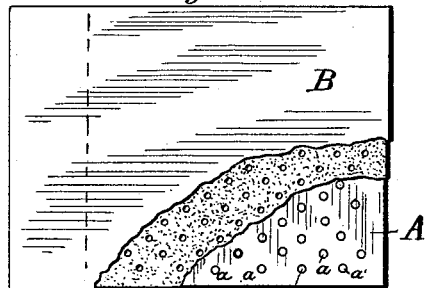
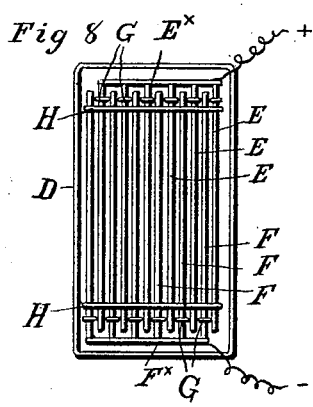
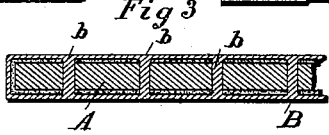
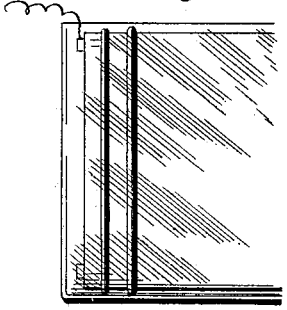
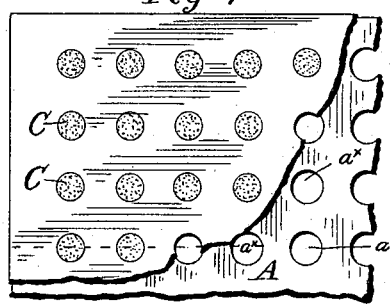
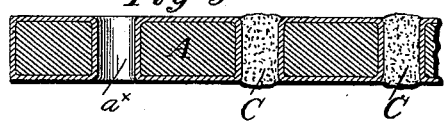
WITNESSES.
R. B. Shepherd.
J. Norman Dixon.
INVENTOR
Isidor Kitsee
By his Attorneys
Wm. C. Strawbridge
J. Bonsall Taylor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

SECONDARY BATTERY.

SPECIFICATION forming part of Letters Patent No. 400,226, dated March 26, 1889.

Application filed May 10, 1888. Serial No. 273,439. (No model.)

*To all whom it may concern:*

Be it known that I, ISIDOR KITSEE, a citizen of the United States, residing at Cincinnati, in the State of Ohio, have invented certain new and useful Improvements in Secondary Batteries, of which the following is a specification.

My invention relates to secondary batteries the elements or electrodes of which are of lead or of other equivalent material possessing for the same use similar properties.

As is well known, the continued use of a secondary battery in which the electrodes are, for instance, of lead, causes the electrodes to eventually become unduly brittle, so that jarring will occasion their disintegration, and also renders them liable to warp, with the result of the separation from their surfaces of the spongy red lead formed upon or applied to them. As a consequence of these conditions it has been heretofore necessary to place the plates at a considerable distance apart or to make the plates of great thickness whereby the cost of constructing as well as of maintaining the battery was increased.

As is further well known the storage capacity of the lead plates is with the employment of a given quantity of lead in proportion to the surface area exposed to the electrolyte; and, as a result, the greater the surface area of the electrode in proportion to the amount of metal of which it is composed, the greater will be the volume of electric energy which said electrode will be capable of retaining and therefore of giving out.

It is also well known that the resistance which the battery liquid of a secondary battery offers to the passage of the current between its electrodes or plates, diminishes with the decrease of the space or interval between the negative and positive electrodes, and that, as a consequence, the greater the surface of the plates and the nearer they are placed together, the greater the electric energy that can be stored in the battery and the smaller the resistance of said battery and therefore the smaller the loss of the current.

To the end of rendering practically available the foregoing well known characteristic conditions under which batteries of this class can be made most serviceable, my invention has for its object, first, the making of an electrode possessing the largest possible surface area with a given quantity of electrode material; and, second, the making of an electrode in which the lead or electrode material, that is to say, the element proper is formed in connection and combined with a supporting member, base, or back, of vulcanized rubber, or other rigid or reasonably stiff material not susceptible to electrolysis, or to corrosive action with the advantageous result that the warping of the lead plate during the operation of "forming" or in the use of the battery is prevented and the placing of the plates very close together in the battery rendered possible.

In order to carry out the foregoing objects recourse may be had to various cognate constructions, those which I especially prefer being depicted in the accompanying drawings which illustrate various embodiments of my invention.

In the drawings, Figure 1 is an end elevational partially fragmentary view of an electrode embodying my invention. Fig. 2 is a view similar to Fig. 1 of an electrode likewise embodying my invention. Fig. 3 is a sectional elevation through the electrode of Fig. 2 in the plane of the dotted line. Fig. 4 is a fragmentary elevational view of an electrode also embodying my invention. Fig. 5 is a magnified sectional view through the electrode of Fig. 4 in the plane of the dotted line upon said figure. Fig. 6 is a fragmentary elevational view of another electrode also embodying my invention and Fig. 7 is a transverse sectional detail of the same. Fig. 8 is a top plan and Fig. 9 an elevation of a battery composed of electrodes embodying my invention.

Similar letters of reference indicate corresponding parts.

In the electrode represented in Fig. 1, A is a supporting member or base of vulcanized rubber, or other preferred material, which, for convenience, I term the plate support, and B is the plate of lead or element proper in the form of an outer covering or envelope inclosing the plate support, or of a surface or surfaces of the support.

The lead covering coating or plate, or element proper, may be applied to its support in any preferred manner either being placed against and suitably secured to it, or by being coated upon it by immersing the support in molten lead or the supporting plate may be electro-plated with a metal-and the active material be applied thereto by hydraulic or other pressure.

In the electrode of Figs. 2 and 3, A is a plate support entirely similar to that shown in Fig. 1, except that it is enveloped or coated with a layer of red lead, and provided with a series of transverse perforations $a$ which pass both through its substance and that of its coating of red lead. The perforations are preferably first formed in the supporting plate and then, when the plate has been coated with the red lead, the latter substance is punched out upon both sides opposite the perforations so that the latter are caused to extend completely through both the plate support and its red lead coating. B is a lead covering or plate applied in any convenient manner, but preferably by the operation of dipping to the plate support and its red lead coating in molten lead, and as to a part of its substance filling the transverse perforations, so that both sides or surfaces of the said plate are united by columns $b$ of metallic lead, as clearly shown in Fig. 3.

In the electrode of Figs. 4 and 5, the plate support A is provided with any preferred number of transverse perforations $a^{\times}$, and is then covered or coated with the metallic lead, which constitutes the electrode proper, preferably by immersing it in the said metal when in a molten condition so that the metal will apply itself not only over both surfaces or faces of the support and around its edges but also to the inner walls of the perforations. After this has been done the perforations can be filled with red lead C as shown.

In the electrode of Figs. 6 and 7, the plate support A is provided with a series of large transverse perforations $a^2$ and also with a series of smaller ones $a^3$. The large perforations are then filled with red lead C, and the plate support with its large perforations so filled is then, preferably, immersed in molten lead which not only applies itself over both faces of the said support, but also fills into the smaller perforations $a^3$, as clearly shown in Fig. 7, in which the outer coating of lead is shown as connected by columns $b$ of its own substance.

In each of the electrodes respectively represented in Figs. 2 and 3, 4 and 5, and 6 and 7, all of which embody the same principle of construction, it will be apparent that by reason of the perforations which are filled either with metallic lead or with red lead, the surface area, so to speak, of the element is increased; while in the electrode of each of said figures, as also in the electrode represented in Fig. 1, support to the element proper is derived from the plate which I have termed the plate support; so that in all of these constructions, which, as is apparent, equally embody my invention, there results an electrode which is not only supported against warping and guarded from brittleness or scaling, but in which a maximum surface area with a given quantity of metal is secured.

In Figs. 8 and 9 which represent a battery composed of electrodes essentially constructed as above set forth, D is the containing box of the battery proper; E are the positive electrodes and F the negative electrodes; all of the former being connected by a transverse conducting plate $E^{\times}$ and all of the latter by a similar conducting plate $F^{\times}$. G are rubber separating bands or washers preferably sprung around the free ends of the respective electrodes to maintain them out of contact, and H are connecting bands also of rubber sprung around all of the electrodes as assembled in a composite couple, to retain them in such assemblage.

It is a well-known fact that when two metal plates are in contact, in a fluid capable of exerting a chemical action upon either or both, a voltaic pile is formed and so called local currents produced, with the result that sooner or later one of the plates will be destroyed. To avoid this result, I employ, in the battery above described, supporting plates formed of a substance unsusceptible to electrolysis.

It will be apparent that in a battery organized as above, the electrodes can be brought into very close proximity so as to insure their most effective action.

The term element employed in this specification and in the claims is used to indicate the layer of lead or other metallic electrode material therein referred to.

Having thus described my invention, I claim:—

1. An electrode for a secondary battery, consisting of a plate of lead or other "element" substance backed and supported by a supporting plate of suitable material unsusceptible to electrolysis, or to corrosive action.

2. An electrode for a secondary battery consisting of a supporting plate unsusceptible to electrolysis or to corrosive action enveloped by lead or other "element" substance, substantially as set forth.

3. An electrode for a secondary battery, consisting of a supporting plate formed of a substance unsusceptible to electrolysis or to corrosive action and provided as to its surface with a layer or coating of lead or other "element" substance, substantially as set forth.

4. An electrode for a secondary battery, consisting of a supporting plate formed of a substance unsusceptible to electrolysis or to corrosive action, provided as to a part or all of its surface with red lead or other "active" material, and also provided with an outer layer or coating of lead or other "element" substance, substantially as set forth.

5. An electrode for a secondary battery, consisting of a supporting plate formed of a substance unsusceptible to electrolysis, or to corrosive action having a series of holes, perforations, or cavities, provided as to the whole or part of its surface with red lead or other "active" material, and also provided with an outer layer or coating of lead or other "element" substance which enters and passes through the perforations, substantially as set forth.

6. An electrode for a secondary battery, consisting of a supporting plate formed of a substance unsusceptible to electrolysis, or to corrosive action having a series of holes, perforations, or cavities, provided with an outer layer or coating of lead or other "element" substance which extends through so as to line the perforations, and which is also provided with red lead or other "active" material within the lead-lined perforations, substantially as set forth.

7. The combination to form a secondary battery, of a containing vessel, a series of positive electrodes each consisting of a supporting plate and an "element" substance, a series of negative electrodes each consisting of a supporting plate and an "element" substance and interdisposed between the positive electrodes, and separating devices to maintain the respective electrodes out of contact, substantially as set forth.

In testimony that I claim the foregoing as my invention I have hereunto signed my name this 1st day of May, A. D. 1888.

ISIDOR KITSEE.

In presence of—
J. BONSALL TAYLOR,
F. NORMAN DIXON.